United States Patent [19]

Kloster

[11] Patent Number: 4,732,365
[45] Date of Patent: Mar. 22, 1988

[54] BENCH MOUNTED SPRING COMPRESSOR

[76] Inventor: Kenneth D. Kloster, 6649 Millridge, Maumee, Ohio 43537

[21] Appl. No.: 6,146

[22] Filed: Jan. 23, 1987

[51] Int. Cl.$^4$ .............................................. B23P 19/04
[52] U.S. Cl. ................... 254/10.5; 254/102; 29/227
[58] Field of Search ........................ 254/10.5, 98, 102; 29/227; 269/76

[56] References Cited

U.S. PATENT DOCUMENTS

| 3,618,195 | 11/1971 | Elmore et al. | 29/227 |
| 4,034,960 | 7/1977 | Kloster | 29/227 |
| 4,219,918 | 9/1980 | Klann | 29/227 |
| 4,434,978 | 3/1984 | Kloster | 269/101 |
| 4,641,814 | 2/1987 | Lala et al. | 29/227 |

FOREIGN PATENT DOCUMENTS

| 2525458 | 12/1976 | Fed. Rep. of Germany | 29/227 |
| 3021084 | 12/1981 | Fed. Rep. of Germany | 254/10.5 |

Primary Examiner—Frederick R. Schmidt
Assistant Examiner—Judy J. Hartman
Attorney, Agent, or Firm—Marshall & Melhorn

[57] ABSTRACT

A bench mounted spring compressor is utilized to compress a helical coil spring of a MacPherson strut suspension assembly. The compressor includes a fixed base member having an adapter attaching the shock absorber thereto. A vertically movable tube is arranged to telescope within a tube secured to the fixed base member. The upper end of the movable tube includes an engaging shoe head assembly which is horizontally movable relative to the vertically movable tube. A manually operable ball nut-helical screw arrangement moves the engaging shoe toward and away from the fixed base member. The ball nut-helical screw arrangement is freely movable in one direction of rotation but inhibited in the opposite direction of rotation. The telescoping tubes are prevented from rotating relative to one another.

10 Claims, 10 Drawing Figures

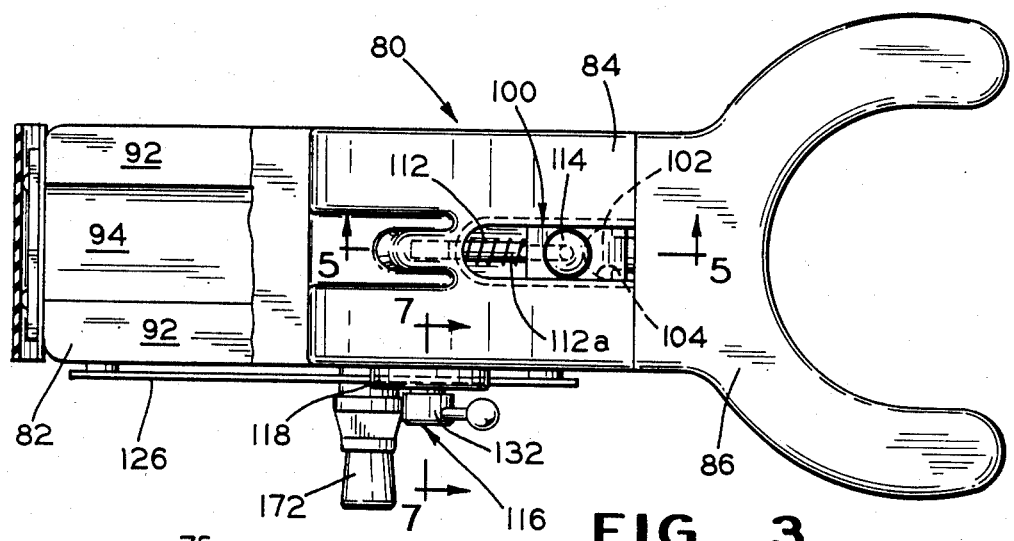
FIG. 3
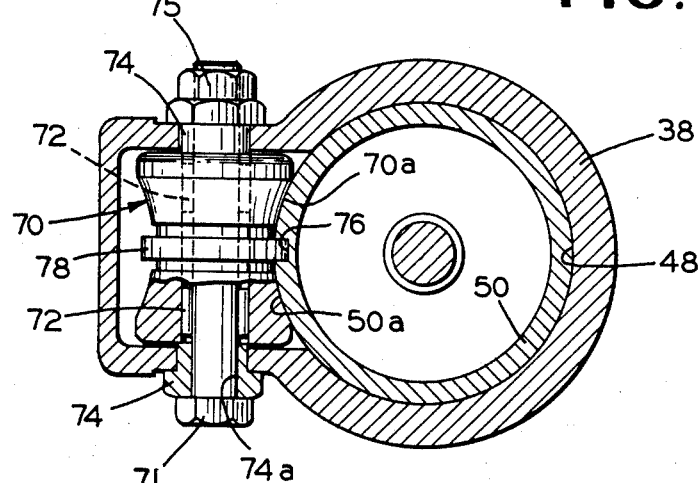
FIG. 4
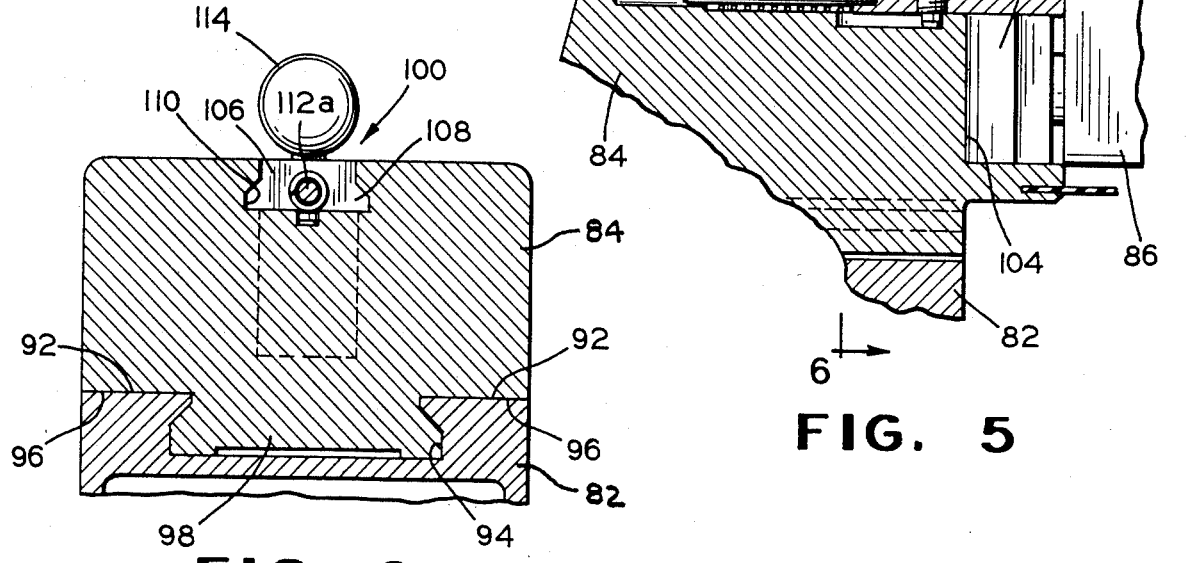
FIG. 5
FIG. 6

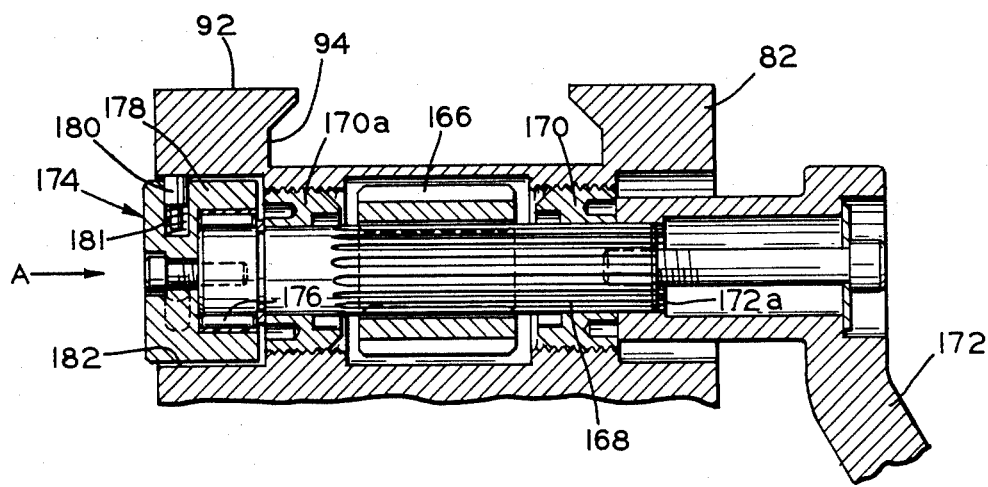
FIG. 9
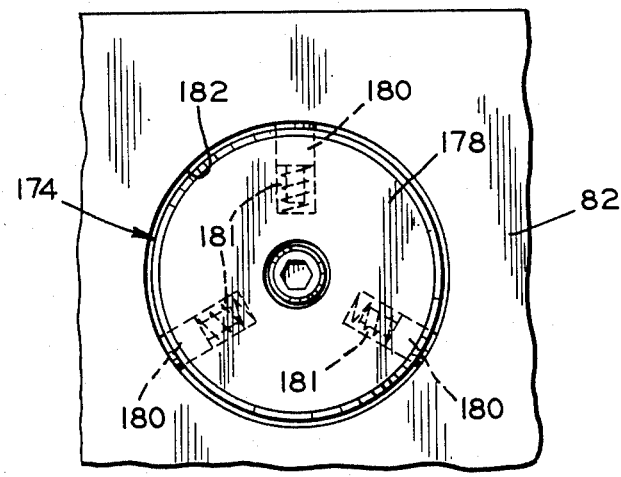
FIG. 10
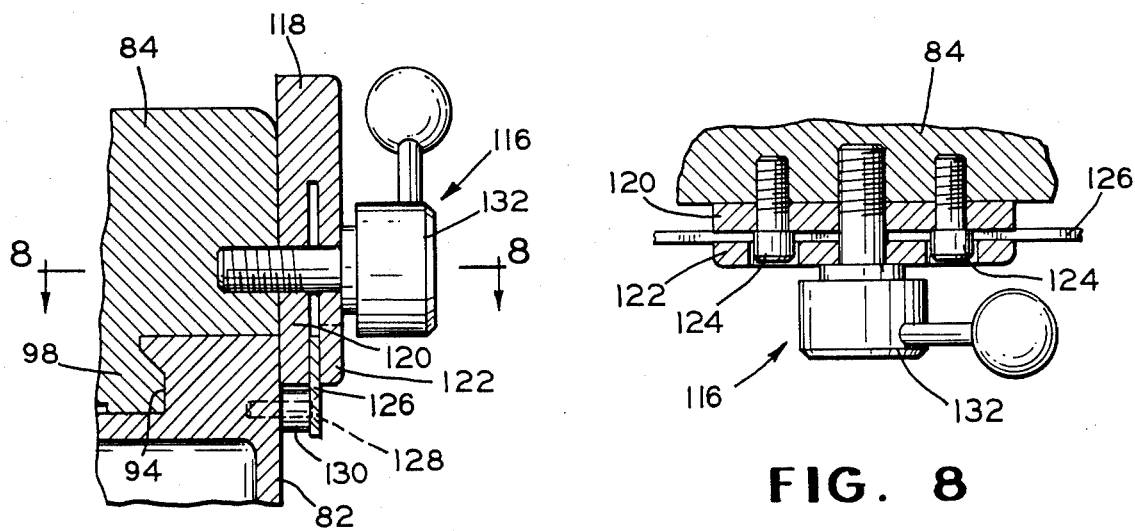
FIG. 7
FIG. 8

BENCH MOUNTED SPRING COMPRESSOR

BACKGROUND OF THE INVENTION

This invention generally relates to an apparatus for compressing spring loaded devices and, more particularly, to a bench-type apparatus for compressing the coil spring of a MacPherson strut suspension assembly.

One type of vehicle suspension system which is becoming increasingly popular is the MacPherson strut suspension system. The MacPherson strut is an integral coil spring-shock absorber assembly which provides a lightweight, compact vehicle suspension system. The MacPherson strut assembly is disclosed in more detail in U.S. Pat. No. 2,624,592 issued to E. S. MacPherson.

One of the problems associated with the MacPherson strut assembly is that the shock absorber unit typically wears out before the associated coil spring. While some vehicles are provided with shock absorber units which can be rebuilt while the strut remains attached to the vehicle, in most instances, the entire strut assembly must be removed from the vehicle. After the strut assembly is removed, it can be disassembled by utilizing either a hand held or bench mounted spring compressor.

Various types of bench mounted spring compressors have been proposed. Examples of such spring compressors can be found in U.S. Pat. Nos. 3,814,382; 4,105,188; 4,295,634; 4,395,020; and 4,558,500.

SUMMARY OF THE INVENTION

The spring compressor apparatus of the present invention comprises a base member which is fixedly secured to a relatively stationary support such as a workbench. A holding device is mounted on the base member for supporting the shock absorber unit of a MacPherson type strut assembly. The base member also carries a force applying mechanism having an upper engaging shoe overlying the MacPherson strut assembly.

More specifically, the force applying mechanism includes a fixed, vertically extending cylindrical tube which depends from and has its upper end secured to the base member, and a reciprocally movable cylindrical tube which is positioned to telescope within the fixed cylindrical tube in vertical coaxial relationship. The upper end of the vertically movable cylindrical tube is provided with a strut engaging shoe for compressing the coil spring of the MacPherson strut. Also, the upper strut engaging shoe is horizontally movable with respect to the vertical axis of the cylindrical tubes.

The movable cylindrical tube may be reciprocally moved by a manually operable lead screw device such as a ball nut and helical groove apparatus or a suitable hydraulic power unit.

The above, as well as other advantages of the invention, will become readily apparent to one skilled in the art from reading the following detailed description of the preferred embodiment of the invention when considered in the light of the accompanying drawings.

BRIEF DESCRIPTION OF THE DRAWINGS

FIG. 3 is a top plan view, with parts broken away, of the spring compressor apparatus illustrated in FIGS. 1 and 2;

FIG. 4 is an enlarged sectional view taken substantially along line 4—4 of FIG. 2;

FIG. 5 is an enlarged fragmentary section view taken substantially along line 5—5 of FIG. 3;

FIG. 6 is an enlarged fragmentary sectional view taken substantially along line 6—6 of FIG. 5;

FIG. 7 is an enlarged fragmentary sectional view taken substantially along line 7—7 of FIG. 3;

FIG. 8 is an enlarged fragmentary sectional view taken substantially along line 8—8 of FIG. 7;

FIG. 9 is an enlarged fragmentary cross-sectional view taken substantially along line 9—9 of FIG. 2; and FIG. 10 is an enlarged fragmentary side elevational view looking in the direction of arrow A of FIG. 9.

DETAILED DESCRIPTION OF THE PREFERRED EMBODIMENT

Figure 1:
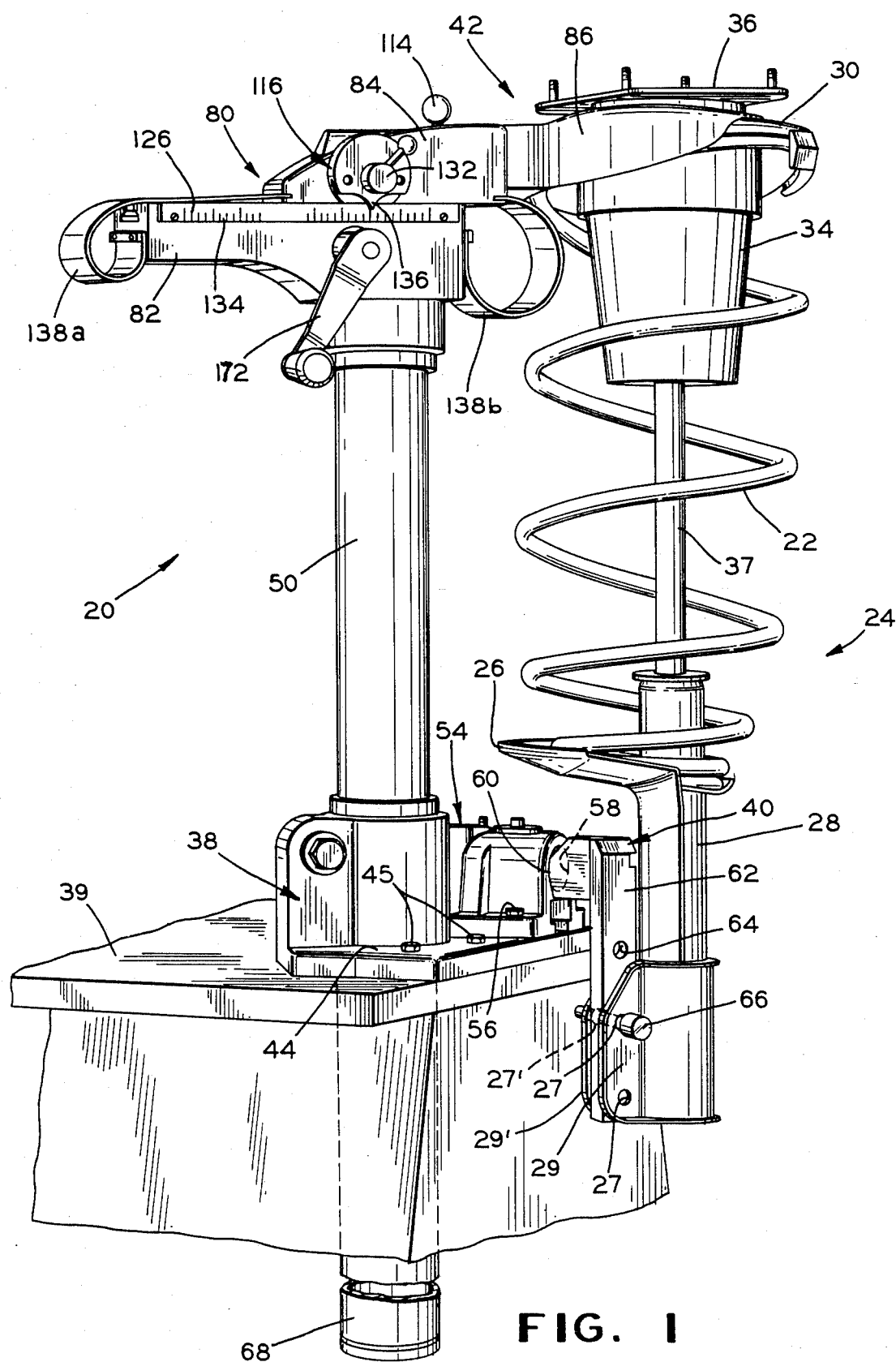
FIG. 1 is a perspective view of a spring compressor apparatus constructed in accordance with the invention.
Figure 2:
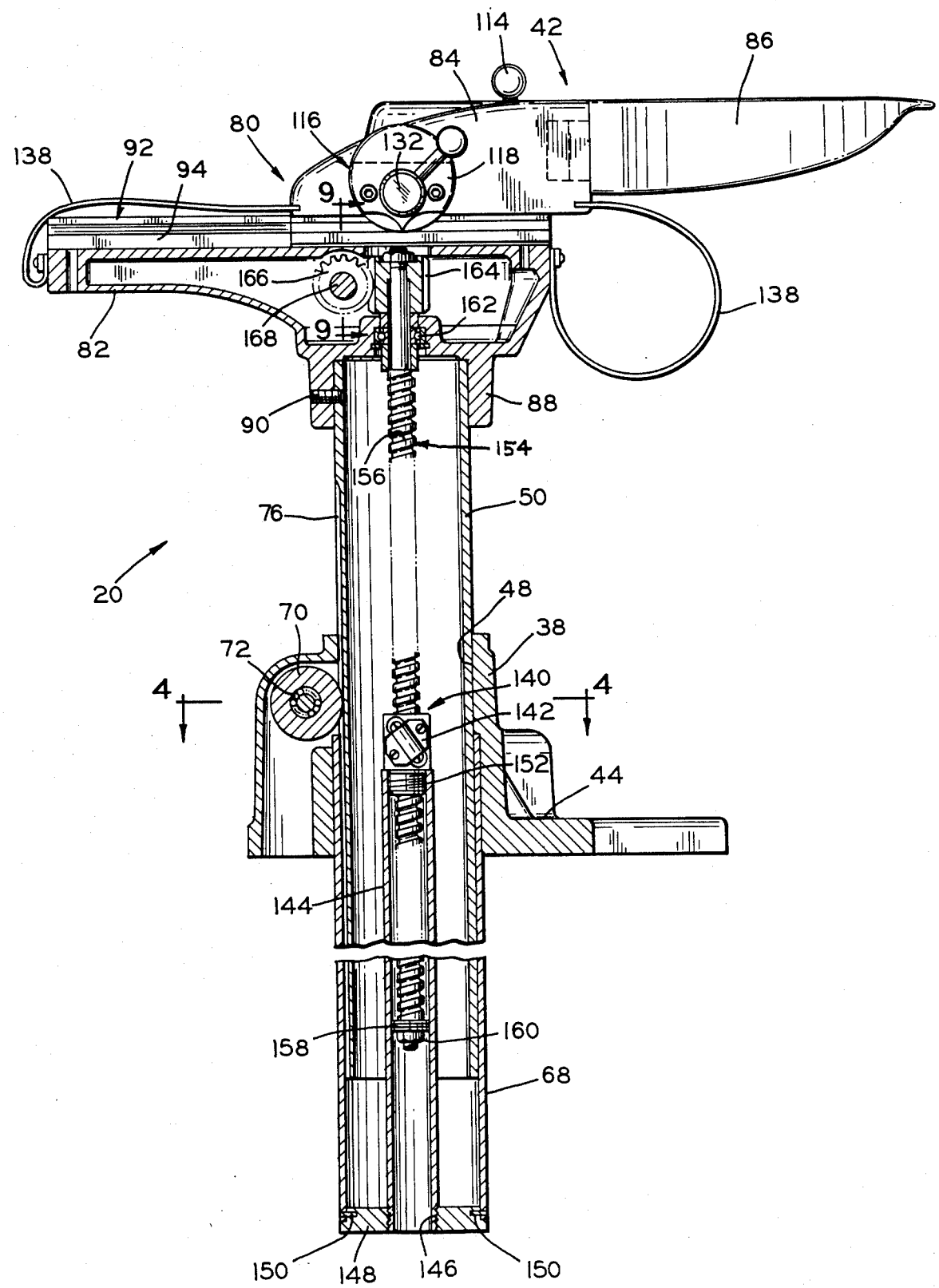
FIG. 2 is an elevational view, partly in section, of the spring compressor apparatus illustrated in FIG. 1.

Referring to the drawings, and particularly to FIGS. 1 and 2, there is illustrated a spring compressor 20 constructed in accordance with the invention for compressing a coil spring 22 of a MacPherson-type suspension strut assembly 24 after it has been removed from a vehicle.

Typically, the strut assembly 24 includes a lower spring platform 26 welded to a cylindrical shock absorber housing 28 for supporting the lower end of the coil spring 22. An upper spring platform 30 engages the upper end of the coil spring 22 and is retained by a top mount flange 36 secured to the upper end of a shock absorber piston rod 37 by a retainer nut (not shown). The top mount flange 36 is adapted to be secured to a vehicle body member (not shown) and bearing means (not shown) are located between the top mount flange and the upper spring platform to permit pivotal movement of the MacPherson strut relative to the vehicle body member about the longitudinal axis of the strut assembly 24. A dust cover 34 is attached to and extends downwardly from the upper spring platform 30.

As illustrated in FIG. 1, the spring compressor apparatus 20 generally comprises a relatively fixed base member 38 secured to a workbench 39, an adapter member 40 carried by the base member 38 for securing the shock absorber housing 28 relative to the base member 38, and a force applying mechanism 42 moveably supported by the base member 38 for compressing the coil spring 22 against the lower spring platform 26.

The base member 38 has a flange portion 44 adapted to receive a number of bolts 45 for securely mounting the base member 38 to a fixed support such as the top surface of the work bench 39, as illustrated in FIG. 1. The base member 38 includes a vertically extending cylindrical bore 48 (shown in FIG. 2) for telescopically receiving a vertically movable cylindrical power tube 50 which, as will be described in detail hereinafter, is a part of the force applying mechanism 42. Although the bore 48 and the power tube 50 have been described as cylindrical elements, it should be noted that other suitably shaped elements such as square tubes may be used.

Referring again to FIG. 1, strut adapter support member 54 is securely mounted to the flange portion 44 of the base member 38 by a number of bolts 56 (only one shown). The adapter support member 54 has a horizontally extending cylindrical bore 58 for receiving a cylindrical end portion 60 of the adapter member 40 which permits the adapter member 40 to rotate about a horizontal axis relative to the support member 54.

The strut adapter member 40 may be of the form illustrated in FIG. 1 and includes an elongated rectangularly shaped block 62 vertically depending from one end of the cylindrical end portion 60. The rectangular block 62 has a number of vertically spaced apart apertures 64 which can be aligned with cooperating apertures 27 and 27' provided in spaced mounting flanges 29 and 29' attached to and extending from the lower end of the shock absorber housing 28. A pin 66 projects through the aligned apertures 27 and 27' and one of the apertures 64 to attach the shock absorber housing 28 to the block portion 62 of the strut adapter member 40 and securely hold the lower end of the MacPherson-type suspension strut assembly 24 in the spring compressor apparatus 20.

The strut adapter member 40 may also be a vise of the type as disclosed in U.S. Pat. No. 4,434,978 issued to Kenneth D. Kloster on Mar. 6, 1984 and herein incorporated by reference. The vise of this patent is adapted to be securely clamped to the shock absorber housing 28. Also, it should be noted that the cylindrical end portion 60 of the strut adapter member 40 may be secured in the adapter support member 54 in the manner described in the above-mentioned patent.

Further, the strut adapter member 40 can be utilized to support a helical spring shoe for engaging a lower coil of the coil spring 22. The helical spring shoe can be mounted in a manner as described in U.S. Pat. No. 4,034,960, which is herein incorporated by reference.

Referring to FIGS. 1 and 2, a vertically disposed cylindrical tube 68 has its upper end secured to the base member 38 by suitable means (not shown) in axial alignment with the aperture 48 of the base member 38. The cylindrical tube 68 extends downwardly and serves as a guide for the telescoping vertically movable power tube 50. Preferably, the power tube 50 telescopes within the guide tube 68 as illustrated in FIG. 2.

In accordance with a further feature of the invention, means are provided to oppose the force exerted on the power tube 50 by the compressed spring through the rotational movement arm of the force applying means 42. Also, means are provided to prevent the tube 50 from rotating about its axis as it travels up and down relative to the guide tube 68. In this regard, the fixed base member 38 is provided with a thrust roller 70 (shown in FIG. 2) having an axis extending transversely to and spaced from the vertical axis of the power tube 50. As shown in FIG. 4, the roller 70 has a concave profile 70a corresponding to the outer cylindrical cross-sectional profile 50a of the power tube 50. The thrust roller 70 may be rotatably mounted about the shaft of a bolt 71 by a pair of spaced apart bearings 72. The ends of the shaft are mounted in eccentrically positioned mounting holes 74a provided in spaced bushings 74 for allowing adjustment of the position of the roller 70 relative to the power tube 50. A nut 75 is secured to the outer threaded end of the bolt 71.

In order to prevent the power tube 50 from rotating relative to the guide tube 68, the outside surface of the power tube 50 is provided with a longitudinally extending groove 76, and the central portion of the thrust roller 70 is provided with an annular key member 78 which projects into the groove 76 and rolls along the groove as the power tube 50 is moved up or down relative to the base member 38.

In addition to the power tube 50, the force applying means 42 includes an adjustable head assembly (shown in FIGS. 2 and 3) generally indicated by the reference numberal 80. The head assembly 80 is secured to the upper end of the power tube 50 for vertical movement therewith and includes a horizontally extending lower support member 82 fixed to the upper end of the power tube 50, and an upper head member 84 mounted for horizontal sliding movement on the lower support member 82. An upper strut engaging shoe 86 is detachably connected to the slidably moveable head member 84.

While the upper strut engaging shoe 86 is illustrated in the drawings as being engageable with the upper surface of the upper spring platform 30, it will be appreciated that the shoe 86 can be modified for engagement with the upper surface of the top mount flange 36. Also, a helical spring shoe (not shown) could be used instead of the shoe 86 for engaging an upper coil of the spring 22.

Referring now to FIGS. 2 and 3, the lower support member 82 may be a hollow casing member having a lower cylindrical hub 88 which is adapted to receive the upper end of the power tube 50. The hub portion 88 is fixedly secured to the end of the power tube 50 by a number of screws 90 (only one shown) for movement therewith. As illustrated in FIGS. 3 and 6, the support member 82 has an upwardly facing, horizontally extending surface 92. The upper surface 92 includes a longitudinal dovetail groove 94 extending the length of the elongated surface.

The head member 84 is a rectangularly shaped, block-type member having a horizontal bottom surface 96 provided with a projecting dovetail member 98. The dovetail member 98 is slidable within the cooperating dovetail groove 94 so as to permit positioning of the head member 84 along the upper surface 92 of the support member 82.

The suspension strut engaging shoe 86 is a U-shaped member adapted to engage the upper surface of the upper spring platform 30 of the strut assembly 24. The shoe 86 is detachably connected to one end of the head member 84 by a releasable locking mechanism 100. As shown in FIGS. 3 and 5, the locking mechanism 100 includes a T-member 102 projecting from the shoe 86 and which is inserted into a cooperating vertically extending slot 104 formed in the head 84 and having a T-configuration generally corresponding to the cross-section of the T-member 102.

As illustrated in FIGS. 3, 5, and 6, the locking mechanism 100 also includes a plate member 106 having a bottom dovetail portion 108 (shown in FIG. 6) which is received within a cooperating dovetail groove 110 provided in the top surface of the head member 84. The plate member 106 is slidable along the groove 110 and is biased by a spring 112 to a position (shown in FIG. 5) wherein the one end 106b of the plate member overlies the slot 104 in the head member 84. The spring 112 is compressed between an end wall 110a of the groove 110 and an face 106a of the plate member 106. The spring 112 surrounds a pin 112a having one end threaded into the plate end face 106a and an opposite end extending into a cavity 113 formed in the end wall 110a. A knob 114 is threadably secured to the plate 106 and is provided to enable an operator to manually slide the plate 106 from the spring biased position to permit the T-member 102 to be slid upwardly out of the slot 104 and thereby release the shoe 86 from the head member 84.

In accordance with another feature of the invention, means 116 (shown generally in FIGS. 1 and 3 but in detail in detail in FIGS. 7 and 8) are provided for locking the moveable head member 84 in a selected horizontal position along the elongated portion of the support member 82. More specifically, a split lock plate 118 having a rigid portion 120 and a flexible portion 122 is mounted on the head member 84. As illustrated in FIGS. 7 and 8, the rigid portion 120 is secured to the head member 84 by a pair of bolts 124 passing through clearance holes in the flexible portion 122. An elongated strap plate 126 (also shown in FIG. 1) is attached in offset relation to the support member 82 so as to project between the rigid and flexible portions 120 and 122, respectively, of the split lock plate 118. An attaching screw 128 and spacer 130 positioned at each end of the strap plate 126 attach the plate 126 in the proper relationship to the support member 82 and with respect to the split lock plate 118.

A rotatable screw knob 132 mounted on the head 84 has a portion bearing against the flexible portion 122 to engage and release the flexible portion 122 with respect to the strap plate 126. For convenience, as shown in FIG. 1, the strap plate 126 may be imprinted with a vernier scale 134 and the flexible portion 122 may be provided with a pointer 136. Also a flexible shield 138a and 138b can be attached to the adjacent ends of the head member 84 and the support member 82 for protecting the dovetail slide arrangement from the ingress of debris.

In the embodiment of the invention illustrated in the drawings, the force applying means 40 also includes a manually operable ball nut drive arrangement 140 (shown in FIG. 2). The drive arrangement 140 generally comprises a ball nut 142 fixedly mounted on the upper end of a load tube 144 concentrically mounted within the guide tube 68 and threadably secured thereto in an upright position as at 146 to an end cap 148. The end cap 148 is fixedly secured to the bottom end of the guide tube 68 by a number of circumferentially spaced apart roll pins 150. The ball nut 142 may be threadably secured as at 152 to the upper end of the load tube 144 as illustrated in FIG. 2.

A ball screw 154 having a helical groove 156 extends downwardly through the ball nut 142 and into the load tube 144. The lower end of the ball screw 154 includes a washer 158 which is retained thereon by a retaining nut 160. The washer 158 slidingly engages the inside surface of the load tube 144 for concentrically positioning the ball screw 154 within the load tube 144. The upper end of the ball screw 154 is journalled in a bearing 162 suitable secured in the head support member 82. A helical driven gear 164 is fixedly mounted on the upper end of ball screw 154 for rotating the ball screw and causing it to move either upwardly or downwardly with respect to the load tube 144.

Referring now to FIGS. 2 and 9, a helical drive gear 166, which meshingly engages the helical driven gear 164, is fixedly mounted on an input splined shaft 168 for rotation therewith. As illustrated in FIG. 9, the splined shaft 168 is journalled in spaced apart bushings 170 and 170a threadably mounted in the support member 82. One end of the splined shaft 168 extends beyond the bushing 170 for receiving cooperating splines 172a of a handle 172. The other end of the splined shaft 168 projects beyond the bushing 170a and has a one-way drag clutch mechanism 174 mounted thereon. Due to the relatively low friction operation of the ball screw drive, the drag clutch 174 is needed to prevent the force of the compressed spring from rotating the handle 172 in an opposite direction and expanding the spring after the handle is released by the operator.

The drag clutch is designed to enable free rotation of the handle 172 in a direction which lowers the force applying means 42 and thus compresses the associated strut spring. Once the spring is compressed and the handle 172 is released by the operator, the drag clutch 174 creates sufficient friction drag on the handle 172 to prevent the force of the compressed spring from rotating the handle in the opposite direction and expanding the spring. However, the friction drag of the clutch mechanism 174 can easily be overcome by the operator through the handle 172, which can be rotated by the operator in a opposite direction to expand the spring.

The drag clutch 174 includes a commercially available locking type needle bearing 176 mounted within an annular housing 178. The bearing 176 permits the splined shaft 168 to freely rotate in the housing 178 in the direction of rotation which compresses the spring while, in the opposite direction of rotation, the needle bearing 176 locks the housing 178 to the splined shaft 168 for rotation therewith. A number of spring biased pins 180 (shown in FIG. 10) are circumferentially spaced around the periphery of the annular housing 178 and are biased by springs 181 to bear against an inner annular wall 182 of the support member 82 for resisting rotation of the housing 178 relative to the support member 82. The springs 181 are selected to exert sufficient force on the pins 180 such that the handle 172 and splined shaft 168 are frictionally held in position through the one way drag clutch after the coil spring 22 is compressed and the handle 172 is released by the operator. As previously mentioned, the frictional drag exerted by the pins can be easily overcome by the operator through the handle 172.

In operation, the MacPherson-type strut assembly 24 is first attached to the adapter member 40. The upper strut engaging shoe 86 is then horizontally adjusted by first releasing the head member 84 by the screw handle 132, and then engaging the shoe 86 with the upper spring platform 30. The operator next cranks the handle 172 in a direction to compress the coil spring 22 to a desired degree. The drag clutch 174 of the compressor apparatus 22 will retain the coil spring 22 in the compressed state and the mechanic may then proceed to service the strut assembly 22 either in the compressed state or otherwise.

In accordance with the provisions of the patent statutes, the principle and mode of operation of the invention has been explained and what is considered to represent its preferred embodiment has been illustrated and described. It should, however, be understood that the invention may be practiced otherwise than as specifically illustrated and described without departing from the scope of the attached claims.

What is claimed is:

1. An apparatus for supporting and compressing a coil spring of a vehicle suspension strut assembly of the type including a coil spring having an upper end retained by an upper spring platform and having a lower end supported by a lower spring platform mounted on a shock absorber unit surrounded by the spring, with shock absorber unit provided with at least one lower mounting flange for securing the strut assembly to a vehicle frame member, said apparatus comprising:

a fixed support;

adapter means for secure attachment to the lower mounting flange of the shock absorber unit for securely supporting the shock absorber unit relative to said fixed support said adapter means including means for rotating the shock absorber unit about an axis generally perpendicular to the longitudinal axis of the shock absorber unit;

upper force applying means for applying a force to an upper portion of the spring;

means for mounting said upper force applying means for movement along a second axis generally perpendicular to a first axis, the first axis being in a direction to compress the coil spring toward the lower platform;

means coupled to said fixed support and said upper force applying means for moving said upper force applying means in a direction to compress the coil spring against the lower spring platform.

2. The apparatus defined in claim 1 wherein the shock absorber unit includes two spaced apart, generally parallel lower mounting flanges having aligned apertures formed therein, and said adapter means includes a block member insertable between said flanges and having an aperture formed therein, and a pin member insertable in said flange apertures and said block aperture for securing the shock absorber unit relative to said fixed support.

3. An apparatus for compressing a helical coil spring comprising:

upper force applying means for applying a force to an upper portion of the spring;

means for mounting said upper force applying means for movement along a second axis generally perpendicular to a first axis, the first axis being in a direction to compress the coil spring toward the lower platform;

lower force applying means for applying platform a force to a lower portion of the spring;

drive means coupled to said upper and lower force applying means for moving said upper and lower force applying means toward one another to compress the spring;

said drive means including a lower tube fixed relative to said lower force applying means and an upper tube fixed relative to said upper force applying means, one of said upper and lower tubes being telescopically received in the other one of said upper lower tubes; and said drive means further including roller means interposed between said upper and lower tubes for opposing a bending force exerted on said tubes by the compressed spring and adapter means for secure attachment to a lower mounting flange of said helical coil spring for securely supporting the helical coil spring relative to said drive means, said adapter means including means for rotating the helical coil about an axis generally perpendicular to the first axis.

4. The apparatus defined in claim 3 including means for preventing rotation of said upper tube relative to said lower tube.

5. The apparatus defined in claim 3 wherein said lower tube defines an outer tube and said upper tube defines an inner tube having a lower end telescopically received by an upper end of said outer tube.

6. The apparatus defined in claim 5 wherein said roller means is mounted for rotation about an axis spaced from and generally transverse to the longitudinal axis of said tubes, and said roller means includes a roller surface engageable with a longitudinally extending surface portion of said inner tube which is opposite the coil spring being compressed.

7. The apparatus defined in claim 6 including means for adjusting the spacing between said roller axis and said longitudinal tube axis to control the engagement of said roller surface with said inner tube.

8. The apparatus defined in claim 6 wherein said roller means is provided with an annular key portion and said inner tube is provided with a longitudinally extending slot for receiving said key portion to prevent relative rotation between said inner and outer tubes.

9. The apparatus defined in claim 3 including a helical lead screw rotatably supported in coaxial relationship with said outer tube and a ball nut fixed relative to said inner tube in coaxial relationship thereto, said ball nut and said lead screw in operative engagement with one another such that rotation of said lead screw causes relative axial movement between said inner and outer tubes.

10. The apparatus defined in claim 9 including means for resisting rotation of said lead screw in a direction which causes said upper and lower force applying means to move away from one another.

* * * * *